United States Patent
Chandrasekaran

(10) Patent No.: US 9,219,616 B2
(45) Date of Patent: Dec. 22, 2015

(54) SUPPORTING MULTIPLE IEC-101/IEC-104 MASTERS ON AN IEC-101/IEC-104 TRANSLATION GATEWAY

(75) Inventor: Ravikumar S. Chandrasekaran, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 272 days.

(21) Appl. No.: 13/115,330

(22) Filed: May 25, 2011

(65) Prior Publication Data

US 2012/0300777 A1 Nov. 29, 2012

(51) Int. Cl.
*H04J 3/16* (2006.01)
*H04L 12/46* (2006.01)
*H04L 29/06* (2006.01)

(52) U.S. Cl.
CPC ...... *H04L 12/4625* (2013.01); *H04L 29/06068* (2013.01); *H04L 29/06095* (2013.01)

(58) Field of Classification Search
CPC ............ H04L 41/0672; H04L 43/0811; H04L 12/4625
USPC .................................................. 370/466, 366
See application file for complete search history.

(56) References Cited

U.S. PATENT DOCUMENTS

| | | | |
|---|---|---|---|
| 6,697,377 B1 * | 2/2004 | Ju et al. .......................... | 370/466 |
| 7,142,556 B1 | 11/2006 | Smith | |
| 7,630,398 B2 * | 12/2009 | Blum ............................. | 370/466 |
| 7,653,526 B1 * | 1/2010 | Ryle et al. ........................ | 703/23 |
| 8,170,010 B2 * | 5/2012 | Bachmann et al. ............. | 370/389 |
| 2003/0208524 A1 * | 11/2003 | Morman et al. ................ | 709/201 |
| 2004/0109472 A1 * | 6/2004 | Choyi et al. .................... | 370/466 |
| 2006/0120293 A1 * | 6/2006 | Wing .............................. | 370/241 |
| 2009/0254224 A1 * | 10/2009 | Rasmussen .................... | 700/287 |
| 2010/0020724 A1 * | 1/2010 | Wimmer et al. ............... | 370/254 |
| 2010/0204843 A1 | 8/2010 | Larsson et al. | |
| 2010/0204851 A1 | 8/2010 | Yuen et al. | |
| 2011/0035067 A1 | 2/2011 | Larsson et al. | |
| 2011/0142025 A1 * | 6/2011 | Agee et al. ..................... | 370/342 |

OTHER PUBLICATIONS

Dang et al, Impacts of electricity market liberalization on centralized generation and telecontrol infrastructure, Aug. 16, 2006, IEEE, pp. 955-959.*
"Station Computer: COM615," Product Guide, ABB Inc., Sep. 2006, pp. 1-15.
"Communication Gateway: COM581," Substation Automation Products, ABB Inc., Jun. 2009, pp. 1-20.
"Communication Gateway: COM610," Product Guide, ABB Inc., Sep. 2004, pp. 1-12.
"Kalkitech Synch 2100," Kalkitech Intellligent Energy Systems, Aug. 3, 2010, pp. 1-4.

(Continued)

*Primary Examiner* — Mounir Moutaouakil
(74) *Attorney, Agent, or Firm* — Novak Druce Connolly Bove + Quigg LLP

(57) ABSTRACT

In one embodiment, a network device, such as a router, receives a frame containing a message from a first terminal unit. The network device modifies the received frame by replacing an original value of an originator identifier field in the frame with a new value that is locally unique on a particular data link. The network device than forwards the modified frame to a selected second terminal unit selected from a plurality of terminal units.

20 Claims, 4 Drawing Sheets

(56) References Cited

OTHER PUBLICATIONS

"SYNC 2000—Filed IO and Communication Gateway Datasheet," Kalkitech Intellligent Energy Systems, Kalki Communication Technologies Ltd, Nov. 19, 2010, pp. 1-2.

"SYNC2000: Quick Start Guide and Warranty Document: Version 1.0," Kalkitech Intellligent Energy Systems, Feb. 2011, pp. 1-2.

"SYNC 1000—Filed IO and Communication Gateway Datasheet," Kalkitech Intellligent Energy Systems, Kalki Communication Technologies Ltd, Nov. 18, 2010, pp. 1-2.

"SYNC1000: Quick Start Guide and Warranty Document: Version 1.0," Kalkitech Intellligent Energy Systems, Nov. 2010, pp. 1-2.

\* cited by examiner

US 9,219,616 B2

SUPPORTING MULTIPLE IEC-101/IEC-104 MASTERS ON AN IEC-101/IEC-104 TRANSLATION GATEWAY

TECHNICAL FIELD

The present disclosure relates generally to computer networks, and, more particularly, to IEC-101/IEC-104 networks.

BACKGROUND

Many electric utility companies utilize serial communication systems in their distribution grids to automate substations and to collect data from various meters, sensors, etc. Utility devices (e.g., meters, sensors, etc.) that have traditionally been interconnected over serial protocols (e.g., IEC-60870-5-101, a.k.a. "IEC-101" or "T-101") may now be transported over an IP network using an IP-ready protocol (e.g., IEC-60870-5-104, a.k.a. "IEC-104" or "T-104"). Generally, this is accomplished by interconnecting the end points with respective routers, which may translate the serial transmissions to IP transmissions, and vice versa, thus emulating to the end points as if they were communicating directly with each other. Newer utility devices may utilize the IEC-104 protocol directly, i.e., utilize IP as a transport protocol instead of a serial communication link. These newer devices may be directly interconnected with a router without requiring translation from a serial transmission to an IP transmission.

One noted problem associated with heterogeneous networks, i.e., networks with devices that utilize disparate protocols such as IEC-101 and IEC-104, is that supervisory control and data acquisition (SCADA) master controllers will be required to be upgraded to utilize the IEC-104 protocol. However, such a SCADA upgrade cannot be done immediately due to the vast number of legacy devices in the field that support only the IEC-101 protocol. Unless all these legacy devices are upgraded to support the IEC-104 protocol, the SCADA controllers cannot be upgraded simultaneously to the IEC-104 protocol. Thus, utilities are adopting a phased approach of upgrading devices and SCADA controllers from IEC-101 to IEC-104. This may result in scenarios where there are more than one SCADA master in the network, i.e., both an IEC-101 SCADA master and an IEC-104 SCADA master.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a network device, such as a router, receives a frame containing a message from a first terminal unit such as a remote terminal unit (RTU). The network device modifies the received frame by replacing an original value of an originator identifier field of the frame with a new value that is locally unique on a particular data link. The network device than forwards the modified frame to a selected second terminal unit, such as a master terminal unit (MTU).

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" (e.g., capacity and performance) of each network.

Figure 1:
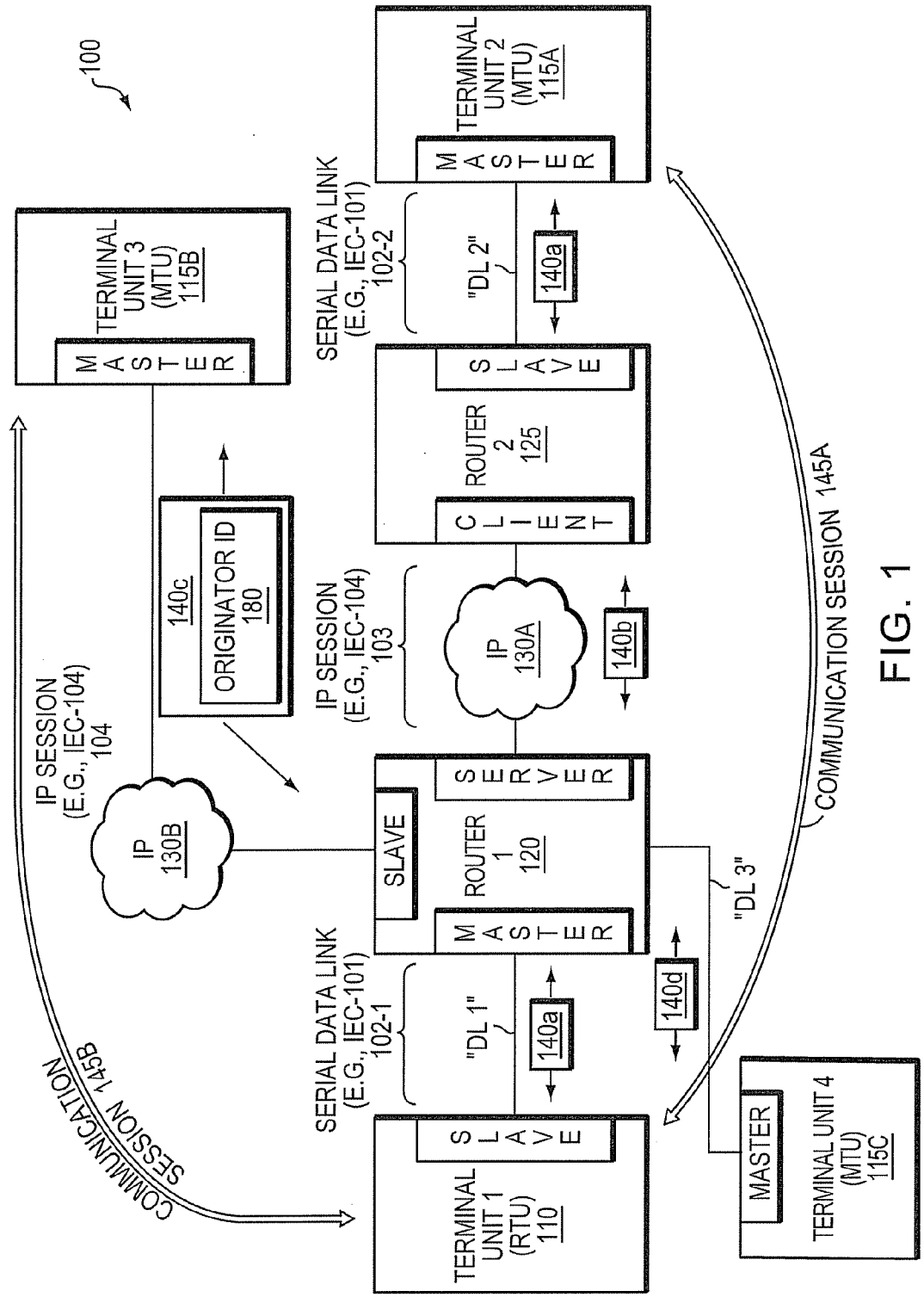
FIG. 1 illustrates an example computer network.

FIG. 1 is a schematic block diagram of an example computer network 100 illustratively comprising nodes/devices, such as first, second and third terminal units 110, 115A, B respectively, interconnected via first and second routers 120 and 125, respectively, as shown. For example, illustrative terminal units may comprise a "remote terminal unit" (RTU, shown as 110) generally configured as a utility device meant to interconnect to various actuators, meters, sensors, etc., and/or a "master terminal unit" (MTU, shown as 115A, 115B) generally located at a supervisory control and data acquisition (SCADA) center. In the example environment 100, MTU 115A implements the IEC-101 protocol while MTU 115B implements the IEC-104 protocol. Both MTUs 115A, B function as SCADA masters in network environment 100. It should be noted that any number of SCADA masters may be utilized in a network. As such, the description of two SCADA masters should be taken as exemplary only.

As described in more detail herein, a terminal unit, such as RTU 110 and MTU 115A, may be interconnected to a translating router via a serial data link and corresponding serial data link (collectively, 102). The translating routers may in turn be interconnected to each other over an IP network 130A through an IP session 103. In this example, RTU 110 and MTU 115A may thus communicate over a communication session 145A, as described in more detail below. Further, RTU 110 and MTU 115B may be interconnected via a translating router via a serial datalink and a corresponding IP session, e.g., router 1 120. Translating router 120 may be operatively interconnected with RTU 110 via DL-1. The router 120 may also be operatively interconnected with MTU 115B via Internet Protocol session 104. In this example, RTU 110 and MTU 115B communicate over a communication session 145B. Those skilled in the art will understand that any number of nodes, devices, links, etc. may be used in the computer network, and that the view shown herein is for simplicity.

Data 140 (e.g., packets, traffic, messages, signals, etc.) may be exchanged among the nodes/devices of the computer network 100 using predefined network communication protocols depending upon the type of interface/network between the communicating devices. For example, data 140*a* may be signals transmitted serially using various serial communication protocols (e.g., modems), while data/packets 140*b, c* may be exchanged using various IP protocols or other suitable protocols as may be appreciated by those skilled in the art (e.g., TCP/IP, User Datagram Protocol (UDP), Asynchronous Transfer Mode (ATM) protocol, Frame Relay protocol, Internet Packet Exchange (IPX) protocol, etc.). Illustratively, session protocols, operating on top of the underlying physical transmission protocols, may be selected according to the underlying physical protocol and desired functionality. For example, as described herein, an example serial data link protocol used for utility devices (meters, sensors, etc.) is IEC-101, while an example IP session protocol is IEC-104. Other types of session protocols may be used, and those mentioned herein are merely illustrative.

In an example, data packet 140*c* includes a plurality of fields including, for example, an originator identifier (ID) field 180. In an example, the originator ID field 180 is contained within an appropriate IEC-101/104 frame contained within one or more IP packets transmitted by one of the terminal units. SCADA controllers are not guaranteed to use globally unique originator IDs unless they are manually preconfigured. Routers 120, 125 are configured to modify received frames with a new originator ID that is locally unique on a particular data link or IP session to enable multiple SCADA masters to be utilized in an IEC-101/IEC-104 environment. Without the router's modification of the frames, each RTU/MTU would need to be individually configured to ensure unique originator IDs. As utility companies may have on the order of the tens of thousands of terminals in use in the field, this individual RTU/MTU configuration is not commercially feasible. However, by utilizing a router to perform an in-line modification of the originator ID field of a frame, the management of multiple SCADA masters in a network becomes scalable and manageable. It should be noted that field 180 is only shown in data packet 140*c* for simplicity. A data packet 140 utilizing the IEC-104 protocol contains an originator ID field 180. Data packets 140 that utilize the IEC-101 protocol may contain an originator ID field 180 as the originator ID field 180 is optional in IEC-101.

Figure 2:
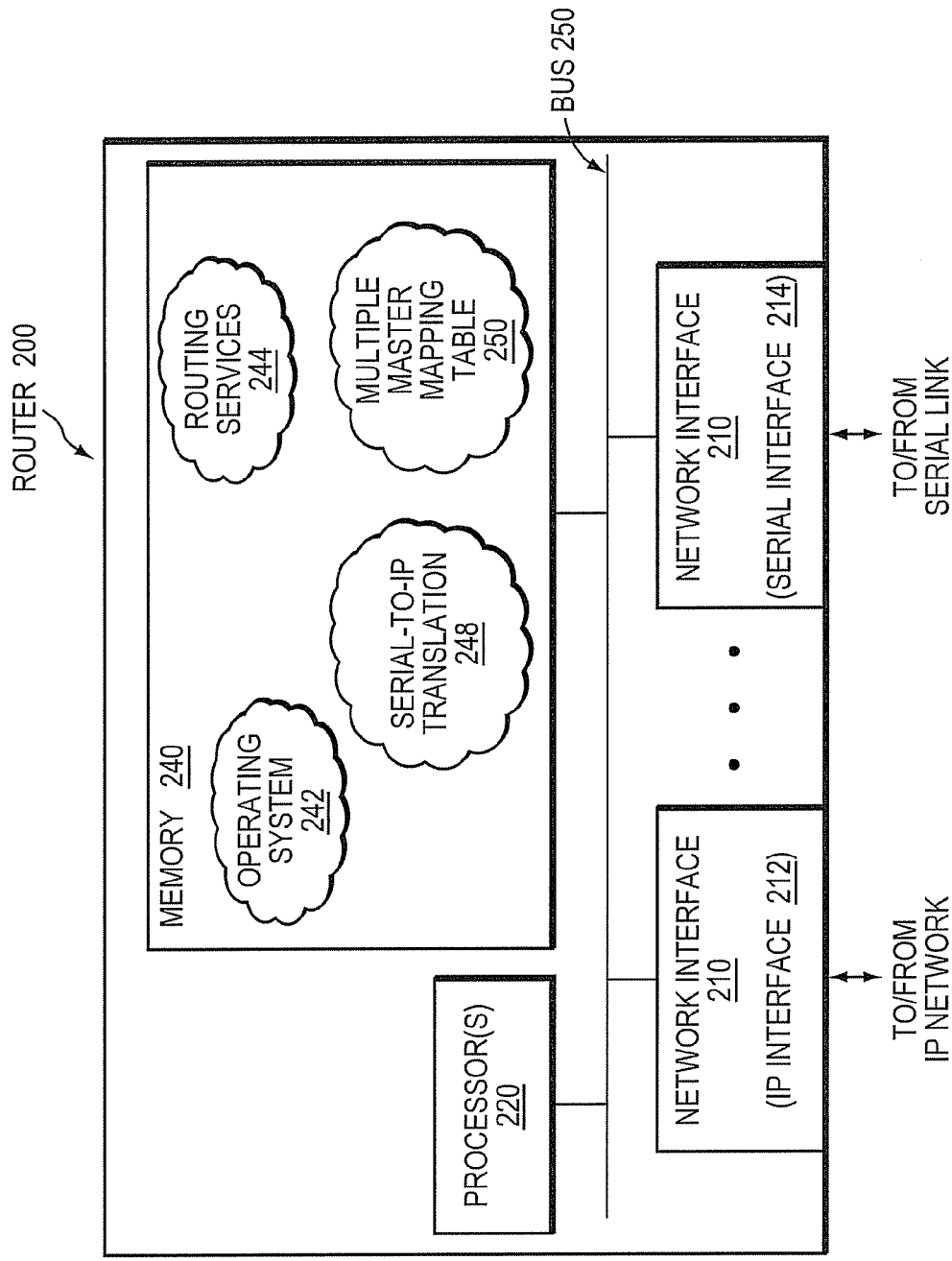
FIG. 2 illustrates an example network device/node.

FIG. 2 is a schematic block diagram of an example node/device 200 that may be used with one or more embodiments described herein, e.g., as routers 120 and 125. The device comprises a plurality of network interfaces 210, one or more processors 220, and a memory 240 interconnected by a system bus 250. The network interfaces 210 contain the mechanical, electrical, and signaling circuitry for communicating data over physical or wireless links coupled to the network. The network interfaces 210 may be configured to specifically transmit and/or receive data using a variety of different communication protocols, such as IP protocols over an IP network interface 212 and serial data link protocols over a serial data link network interface 214.

The memory 240 comprises a plurality of storage locations that are addressable by the processor(s) 220 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244 and a "serial-to-IP translating" process 248. It will be apparent to those skilled in the art that other types of processors and memory, including various computer-readable media, may be used to store and execute program instructions pertaining to the techniques described herein.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining Virtual Routing and Forwarding (VRF) instances or tunneling protocols, such as for Multi-Protocol Label Switching, etc., each as will be understood by those skilled in the art.

As shown in FIG. 1, assume that the terminal unit 1 is a remote terminal unit (RTU) that acts as a slave to a master terminal unit (MTU) located on terminal unit 2. It should be noted that the following is brought only as an example and the same explanation equally applies to a balanced mode wherein the RTUs communicate in a peer-to-peer relationship. (Notably, as used herein, a "local terminal unit" implies any type of terminal unit that is attached locally to the router, while "remote terminal unit" implies any type of terminal unit that is located in a remote site beyond the IP network. As such, "RTU" should be used to imply only a specific name of a terminal unit according to the specific utility example given herein.) According to the translation illustratively used to interconnect the serial data links over the IP network, router 1 (an RTU router) 120 may act as master to the RTU over data link 1 ("DL1"), and as a slave to Router 2 (router 125) in a server/client relationship. Router 2 (router 125) may then act as the slave to the master MTU 115A over data link 2 (DL2).

In this setup, the translation process 248 of router 1 (120) translates the serial (e.g., IEC-101) messages from the RTU 110 (a slave device) and transmits them as IP packets (e.g., IEC-104 messages) to router 2 (125). Router 2 (125) may then translate those IP packets back to serial messages (e.g., IEC-101), and transmits those messages over DL2 to the MTU 115A (e.g., a SCADA control). This double translation allows the MTU 115A to receive the native serial traffic.

As shown in FIG. 1, further assume that RTU 110 is a slave to a SCADA master located on MTU 115B. Router 1 120 may act as a master to the RTU 110 over DL1 and as a slave to MTU 115B over IP session 104. In this setup, the translation process 248 of Router 1 translates the serial messages from the RTU to IP packets to be transmitted to MTU 115B. This permits MTU 115B to receive native IP-based traffic in accordance with the IEC-104 protocol.

Illustratively routers 120, 125 may contain a multiple master mapping table 250, shown in FIG. 2 in memory 240. It should be noted that the multiple master mapping table 250 may be stored in the other locations. As such, the description of table 250 being stored in memory 240 should be taken as exemplary only. The multiple master mapping table 250 illustratively contains a series of entries that map tuples a particular SCADA and originator ID to a new originator ID value that is locally unique for particular session. For example, router 120 would maintain a multiple master mapping table that would map between the two SCADA controllers and non-unique originator ID values to a series of a originator ID value set of local unit unique for session DL-1. In this manner, each individual SCADA master does not need to be configured to utilize globally unique originator ID values, nor do each individual RTU in the field need to be configured. In the example environment 100, containing two SCADA masters, it is possible that each of the masters utilize the same values in the originator ID field for all commands that each originates. For example, assume that MTU 115A is deemed to be a first SCADA (SCADA-1) and MTU 115B is deemed to be a second SCADA (SCADA-2). Both of the MTUs may utilize the same originator IDs in all commands, e.g., values A, B, C. Thus, a frame may be in the network with an originator ID of A and it could be originating from either MTU. The mapping table 250 is utilized by routers to enable the creation of locally unique originator IDs for a particular data link.

For example, the mapping table 250 may illustratively comprise entries such as:
(SCADA-1, A)↔J
(SCADA-1, B)↔K
(SCADA-1, C)↔L
(SCADA-2, A)↔M
(SCADA-2, B)↔N
(SCADA-2, C)↔P Each of these entries maps a tuple consisting of (SCADA number, originator ID value) to a different originator ID value. Use of the table 250 enables a router to modify the originator ID field 180 of a frame with the new originator ID and also identifies to which SCADA a frame should be forwarded. Thus, if a router having these illustrative entries in its mapping table 250 receives a frame from a RTU with an originator ID field 180 indicating a value of P, the router will map that to a new originator ID field value of C and forward the modified frame on to the second SCADA. Similarly, if a router receives a frame having an originator ID field value of A, by identifying which SCADA send the frame, the router may modify the frame's originator ID field to either a value of J (in the case of the first SCADA) or M (in the case of the second SCADA).

Exemplary MTU 4 115C may be configured to utilize only IEC-101. Further, MTU 115C may be configured to not utilize an originator ID field 180 in frames 140d. In response to the presence of a terminal unit that does not utilize originator ID field 180, the router (router 120) will add an originator ID field 180 into frames before forwarding them to RTU 110. Similarly, the router will remove originator ID field 180 from frames received from RTU 110 before forwarding the frames to MTU 115C.

Figure 3:
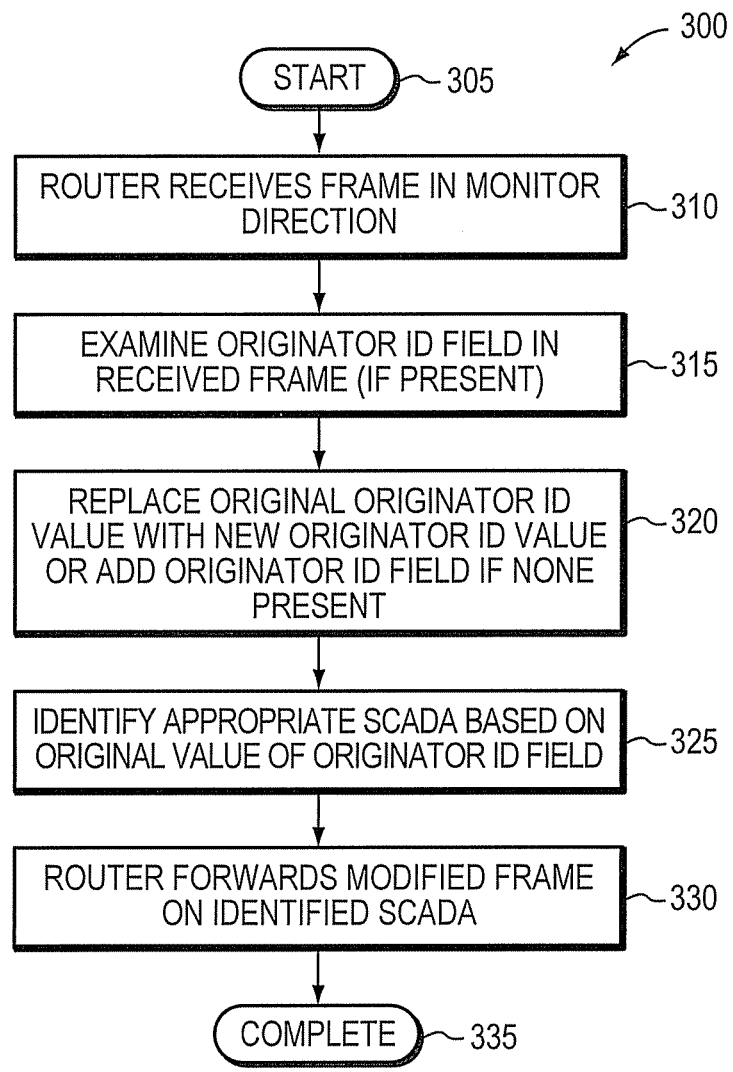
FIG. 3 illustrates an example procedure for routing frames received from a remote terminal unit.

FIG. 3 illustrates an example procedure 300 for routing frames received from a RTU. The procedure 300 begins in step 305 and continues to step 310 where a router receives a frame in the monitoring direction, for example, router 120 may receive a frame from RTU 110 over DL1. The router then examines the originator ID field in the received frame in step 315. That is, the router, or more specifically, the routing services module 244 examines the originator ID field 180 of the received frame to identify the value contained therein that was originally placed in the frame by the transmitting terminal unit, for example RTU 110.

The original originator ID value is replaced with a new originator ID value by the router in step 320. For example, should the original originator ID value be K, then the router will replace the originator ID field value with a value as determined by the multiple master mapping table 250. For example, using the example entries described above, the value of K maps to a new originator ID field value of B on SCADA-1. The appropriate SCADA is identified based on the original value of the originator ID field in step 325. Again, using the example of a received original originator ID value of K, the router utilizes the multiple master mapping table 250 to determine that the frame should be forwarded to SCADA-1.

The router then forwards the modified frame on the identified SCADA in step 330. Using the example herein, the router would forward the modified frame to MTU 115A (SCADA-1) via router 2 and any other intermediate network devices. The procedure 300 then completes in step 335.

Figure 4:
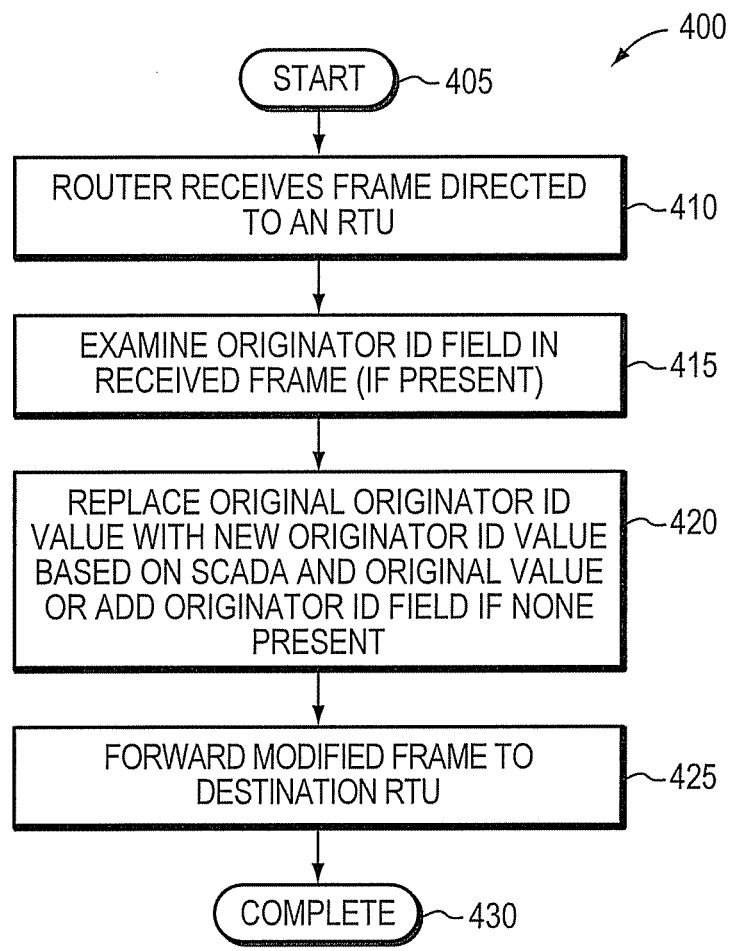
FIG. 4 illustrates an example procedure for routing frames received from a master terminal unit.

FIG. 4 illustrates a example procedure 400 for routing frames received from a MTU. The procedure 400 begins in step 405 and continues to step 410 where a router receives a frame directed to a RTU from a MTU. For example, router 120 may receive a frame from MTU 115B be received over IP session 104. The router examines the originator ID field in received frame in step 415. For example, the router may detect that the originator ID field 180 contains a value of B.

The router then replaces the original originator ID value with a new originator ID value based on the original value and the SCADA on which the frame was received in step 420. The router utilizes the multiple master mapping table 250 to determine that the tuple of SCADA-2 and originator IDS value of B maps to a new originator ID value of N. The router then modifies the appropriate originator ID field with the new value. The router then forwards the modified frame to destination RTU in step 425. In the example of a frame a received from MTU 115B directed to RTU 110, router 120 will forward the frame over DL1 to RTU 110. In this example, a protocol translation from IEC-104 to IEC-101 is also necessary. The procedure then completes in step 430.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a non-transitory tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, by a network device, one or more frames from a plurality of terminal units in an IEC-101/IEC-104 network;
   in response to a received frame from a first terminal unit not containing any originator identifier field, adding an originator identifier field with a first original value to the received frame from the first terminal unit, the originator identifier field complying with the IEC-101/IEC-104 protocol;
   in response to a received frame from a second terminal unit containing the originator identifier field with a second original value, modifying the received frame from the second terminal unit by replacing the second original value of the originator identifier field with a new value identified by the network device, the second original value placed in the originator identifier field by the second terminal unit to identify the second terminal unit; and forwarding a modified frame to a third terminal unit selected from the plurality of terminal units in the IEC-101/IEC-104 network.

2. The method as in claim 1, wherein the plurality of terminal units comprises a remote terminal unit.

3. The method as in claim 1, wherein the third terminal unit comprises a master terminal unit and wherein the plurality of terminal units comprises a plurality of master terminal units.

4. The method as in claim 1, wherein the received frame from the first terminal unit is received on a serial transport data link.

5. The method as in claim 4, wherein the modified frame is forwarded over an Internet Protocol based session.

6. The method as in claim 1, wherein the second original value of the originator identifier field comprises a locally unique value for a communication link between the second terminal unit and the network device.

7. The method as in claim 1, wherein the new value of the originator identifier field comprises a locally unique value for a communication link between the network device and the third terminal unit.

8. The method as in claim 1, wherein the network device comprises a router.

9. The method as in claim 1, wherein replacing the second original value further comprises identifying the new value by examining a tuple comprising the second original value and an identifier of a particular master controller.

10. The method as in claim 9, wherein the particular master controller comprises a supervisory control and data acquisition master.

11. An apparatus, comprising:
    a first network interface configured to communicate with a first data link in an IEC-101/IEC-104 network;
    a second network interface configured to communicate with a second data link in the IEC-101/IEC-104 network;
    one or more processors coupled to the network interfaces and adapted to execute one or more processes; and
    a memory adapted to store a routing process executable by each processor, the process when executed operable to: i) receive, via the first data link, one or more frames from a plurality of terminal units in the IEC-101/IEC-104 network; ii) in response to a received frame from the first terminal unit not containing any originator identifier field, add an originator identifier field with a first original value to the received frame from the first terminal unit, the originator identifier field complying with the IEC-101/IEC-104 protocol; iii) in response to a received frame from a second terminal unit containing the originator identifier field with a second original value, modify the received frame from the second terminal unit by replacing the second original value of the originator identifier field with a new value identified by the apparatus, the second original value placed in the originator identifier field by the second terminal unit to identify the second terminal unit; and iv) forward a modified frame, via the second data link, to a third terminal unit selected from the plurality of terminal units in the IEC-101/IEC-104 network.

12. The apparatus as in claim 11, wherein the first data link comprises a serial data link.

13. The apparatus as in claim 11, wherein the second data link comprises an Internet Protocol based data link.

14. The apparatus as in claim 11, wherein the plurality of terminal units comprises a remote terminal unit.

15. The apparatus as in claim 11, wherein the second original value of the originator identifier field comprises a locally unique value for the first data link between the second terminal unit and the apparatus.

16. The apparatus as in claim 11, wherein the new value of the originator identifier field comprises a locally unique value for the second data link between the apparatus and the third terminal unit.

17. The apparatus as in claim 11, wherein the memory is further configured to store a mapping table comprising a plurality of entries, each of the plurality of entries mapping a tuple comprising an originator identifier and a particular master controller with a locally unique originator identifier value.

18. The apparatus as in claim 17, wherein the particular master controller comprises a supervisory control and data acquisition master controller.

19. A non-transitory computer-readable storage medium including instructions that, when executed by at least one processor of a computing system, cause the computing system to:
    receive one or more frames from a plurality of terminal units in an IEC-101/IEC-104 network;
    in response to a received frame from a first terminal unit not containing any originator identifier field, add an originator identifier field with a first original value to the received frame from the first terminal unit, the originator identifier field complying with the IEC-101/IEC-104 protocol;
    in response to a received frame from a second terminal unit containing the originator identifier field with a second original value, modify the received frame from the second terminal unit by replacing the second original value of the originator identifier field with a new value identified by the network device, the second original value placed in the originator identifier field by the second terminal unit to identify the second terminal unit; and
    forward a modified frame to a third terminal unit selected from the plurality of terminal units in the IEC-101/IEC-104 network.

20. The non-transitory computer-readable storage medium of claim 19, wherein the plurality of terminal units comprises a remote terminal unit.

* * * * *